United States Patent
Gadrey et al.

(10) Patent No.: US 9,868,173 B2
(45) Date of Patent: Jan. 16, 2018

(54) METHOD FOR ARC WELDING WITH A DUAL GAS FLOW, WITH A CENTRAL FLOW CONTAINING ARGON AND HYDROGEN, AND WITH A SHEATH FLOW INCLUDING ARGON AND EITHER CARBON DIOXIDE OR OXYGEN

(75) Inventors: Sébastien Gadrey, Gouloux (FR); Jean-Pierre Planckaert, Conflans Ste. Honorine (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1717 days.

(21) Appl. No.: 13/146,386

(22) PCT Filed: Feb. 3, 2010

(86) PCT No.: PCT/FR2010/050172
§ 371 (c)(1),
(2), (4) Date: Jul. 26, 2011

(87) PCT Pub. No.: WO2010/092279
PCT Pub. Date: Aug. 19, 2010

(65) Prior Publication Data
US 2011/0290772 A1 Dec. 1, 2011

(30) Foreign Application Priority Data
Feb. 11, 2009 (FR) .................... 09 50845

(51) Int. Cl.
*B23K 9/09* (2006.01)
*B23K 9/167* (2006.01)
(Continued)

(52) U.S. Cl.
CPC ............ *B23K 9/167* (2013.01); *B23K 35/222* (2013.01); *B23K 35/383* (2013.01);
(Continued)

(58) Field of Classification Search
CPC .......... B23K 2201/185; B23K 2203/04; B23K 2203/05; B23K 35/222; B23K 35/383; B23K 9/167
(Continued)

(56) References Cited

U.S. PATENT DOCUMENTS 3,250,893 A  5/1966 Nestor
5,714,729 A * 2/1998 Yamada et al. ............... 219/75
(Continued)

FOREIGN PATENT DOCUMENTS

JP   55 122684    9/1980
JP   07 256463   10/1995
(Continued)

OTHER PUBLICATIONS

Bradstreet, B.J., "Effect of surface tension and metal flow on weld bead formation," Welding Journal (1968), vol. 47, No. 7, pp. 314-322.
(Continued)

Primary Examiner — Sang Y Paik
(74) Attorney, Agent, or Firm — Elwood L. Haynes

(57) ABSTRACT

The invention relates to an arc welding method that implements an arc welding torch provided with an electrode, in which a central gas flow is supplied so as to contact the electrode and an annular gas flow is supplied on the periphery of said first gas flow. The central gas flow contains only argon and hydrogen (H2), the hydrogen content being 2 to 8 vol %. The sheath gas flow only contains argon and 1.8 to 3 vol % of carbon dioxide (CO2) or 0.9 to 1.5 vol % of oxygen (O2). The method is used for welding parts made of steel, in particular stainless steel or carbon steel, as well as steel coated with zinc or aluminium or any other material for preventing the corrosion of said steel.

10 Claims, 1 Drawing Sheet

(51) Int. Cl.
    *B23K 35/22*     (2006.01)
    *B23K 35/38*     (2006.01)
    *B23K 101/18*    (2006.01)
    *B23K 103/04*    (2006.01)

(52) U.S. Cl.
    CPC .... *B23K 2201/185* (2013.01); *B23K 2203/04* (2013.01); *B23K 2203/05* (2015.10)

(58) Field of Classification Search
    USPC ............. 219/136, 137 R, 121.45–121.57
    See application file for complete search history.

(56) References Cited

U.S. PATENT DOCUMENTS

| | | | |
|---|---|---|---|
| 5,821,493 A | | 10/1998 | Beyer et al. |
| 5,938,948 A | * | 8/1999 | Oros et al. ............... 219/121.46 |
| 6,303,891 B1 | * | 10/2001 | Gault ............................ 219/74 |
| 2002/0008094 A1 | * | 1/2002 | Briand et al. ............. 219/137 R |
| 2004/0188390 A1 | | 9/2004 | Satou et al. |

FOREIGN PATENT DOCUMENTS

| | | |
|---|---|---|
| JP | 2000 117449 | 4/2000 |
| JP | 2000 237875 | 9/2000 |
| JP | 2000 309843 | 11/2000 |

OTHER PUBLICATIONS

Gratzke, U. et al., "Theoretical approach to the humping phenomenon in welding processes," J. Phys. D: Appl. Phys., 25 (1992) pp. 1640-1647.
Heiple, C.R. et al., "Mechanism for minor element effect on GTA fusion zone geometry," Welding Journal (Apr. 1982), pp. 97-102.
Heiple, C.R. et al., "The effect of trace elements on TIG weld penetration," Paper 36, Proceedings of TWI International Conference, London, U.K., Nov. 15-17, 1983.
Keene, B.J. et al., "Effects of interaction between surface active elements on the surface tension of iron," Canadian Metallurgical Quarterly (1982), vol. 21, No. 4, pp. 393-403.
Lin, M.L. et al., "Influence of arc pressure on weld pool geometry," Welding Journal (1985), vol. 64, No. 6, pp. 163-169.
Mendez, P.F. et al., "Penetration and defect formation in high-current arc welding," Welding Journal (2003), vol. 82, No. 10, pp. 296-306.
Mills, K.C. et al., Factors affecting variable weld penetration, International Materials Reviews (1990), vol. 45, No. 4, pp. 185-216.
Savage, W.F. et al., "Effect of arc force on defect formation in GTA welding ," Welding Journal (1979), vol. 58, No. 7, p. 212-224.
French Search Report for related FR 0950845, dated Sep. 3, 2009.
International Search Report for related PCT/FR2010/092279, dated May 12, 2010.

* cited by examiner

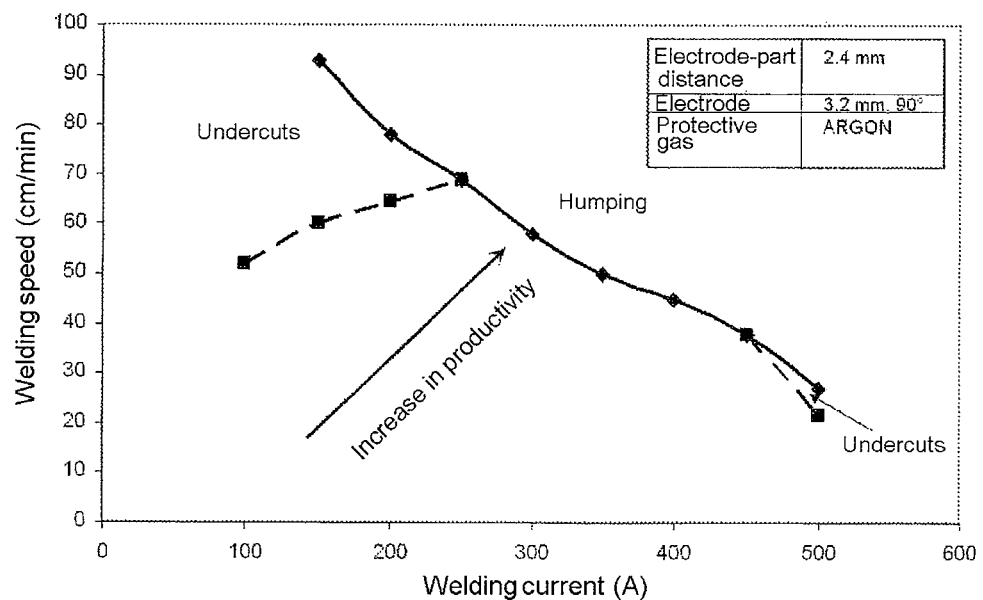
FIGURE 1
FIGURE 2
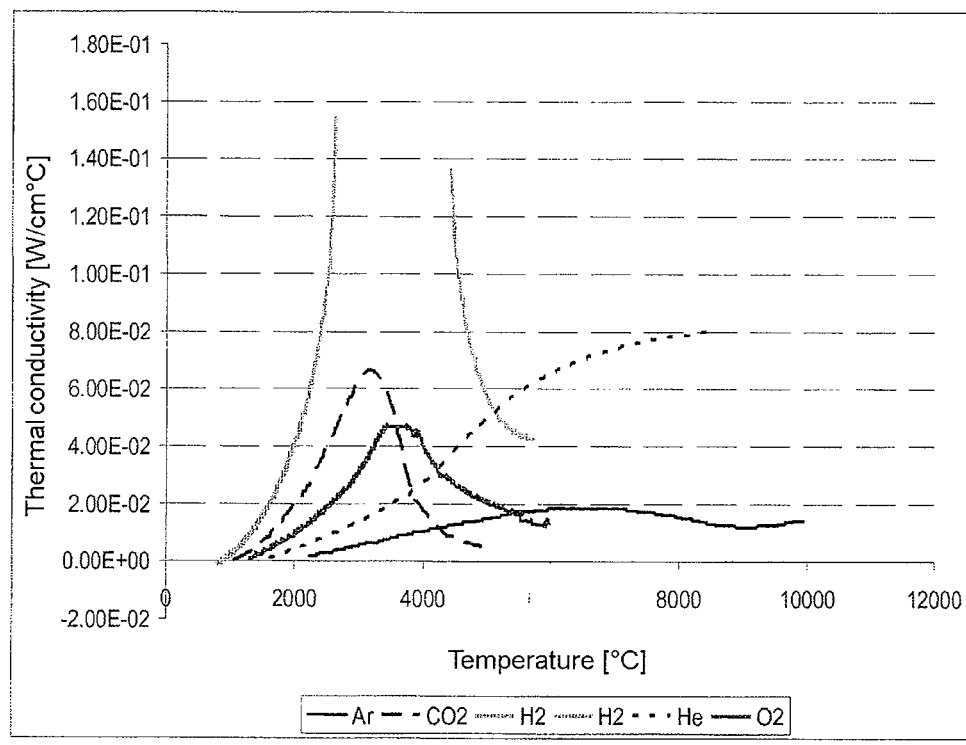

METHOD FOR ARC WELDING WITH A DUAL GAS FLOW, WITH A CENTRAL FLOW CONTAINING ARGON AND HYDROGEN, AND WITH A SHEATH FLOW INCLUDING ARGON AND EITHER CARBON DIOXIDE OR OXYGEN

CROSS REFERENCE TO RELATED APPLICATIONS

This application is a 371 of International PCT Application PCT/FR2010/050172, filed Feb. 3, 2010, which claims priority to French Application 0950845, filed Feb. 11, 2009, the entire contents of which are incorporated herein by reference.

Background

The invention relates to an electric arc welding process using an arc welding torch provided with an electrode and a dual flow having a composition that makes it possible to prevent or at least minimize the phenomenon of "humping".

The document by B. J. Bradstreet, *Effect of surface tension and metal flow on weld bead formation*, Welding Journal, 1968, vol. 47, no. 7, pp. 314-322, relates to the phenomenon known as "humping" in MIG welding, whereas the document by U. Gratzke et al., *Theoretical approach to the humping phenomenon in welding processes*, J. Phys. D. Appl. Phys., 1992, vol. 25, pp. 1640-1647 demonstrates the existence of this phenomenon in TIG welding, in submerged arc welding, in laser welding and in electron beam welding.

The welds suffering from "humping" initially appear to have random morphologies. However, a detailed observation shows that two types of morphologies may be defined, namely:

gouging region morphology (GRM),
and beaded cylinder morphology (BCM).

Welds exist that may simultaneously exhibit features of these two morphologies although this is quite rare.

There are four theories that try to explain the appearance of humping. Among these, some are specifically aimed at explaining a type of morphology of the defect. Thus, the vortex model and the arc effect target the morphology of GRM type, and the capillary instability model targets that of BCM type, whereas the "Marangoni" approach does not define application morphology.

More specifically, the Marangoni model, described by K. C. Mills et al., *Factors affecting variable weld penetration*, International Materials Reviews, 1990, vol. 45, no. 4, pp. 185-216, which reviews the factors affecting weld penetration, suggests that the "humping" and the undercuts could be attributed to the Marangoni forces created in the weld pool.

Furthermore, the vortex model described by M. L. Lin et al., *Influence or arc pressure on weld pool geometry*, Welding Journal, 1985, vol. 64, no. 6, 163-169, is based on a vortex arc model in order to explain the increase in penetration observed during high-current TIG welding.

According to the capillary instability model, the phenomenon of "humping" is based on Lord Rayleigh's theory of the capillary instability of a free liquid cylinder of small diameter which, when it is suspended in a vacuum, is unstable and separates into small drops.

Finally, according to the model of the arc influence, during the normal operation of an arc welding installation of MIG or TIG type, there is a balance of the pressures between the arc and the pool. At high currents, the drag forces of the plasma are high enough to displace the majority of the molten metal behind the arc. The balance of the forces written by P. F. Mendez et al., *Penetration and defect formation in high current arc welding*, Welding Journal, 2003, vol. 82, no. 10, pp. 296-306, establishes a transition line which marks the passage from the gouging region to the trailing region.

Several solutions have been proposed to try to prevent this "humping" phenomenon in TIG welding and thus improve the performances of the process, in particular in automatic TIG welding.

Indeed, the travel speeds, that is to say welding speeds, used in automatic TIG welding are often limited by the occurrence of defects. A productivity limit imposed by "humping" can be represented as in FIG. 1.

FIG. 1, which is taken from the document by W. Savage, et al., *Effect of arc force on defect formation in GTA welding*, Welding Journal, 1979, vol. 58, no. 7, pp. 212-224, represents the welding speed (on the y-axis, expressed in cm/min) as a function of the welding current (on the x-axis, expressed in A). As can be seen, it shows the acceptance limits of the weld beads in terms of welding speed that can be attained at a given current. The continuous line connects various points of operation where the "humping" phenomenon appears. The broken line corresponds to the boundary of the appearance of another defect, namely "undercuts". Between these two lines there is a productivity region where the beads are free of these defects. In order to increase the productivity of a welding process, it is therefore advisable to move the boundary of the appearance of "humping" in order to increase the area of productivity.

In order to do this, it has been proposed to improve the control of the transfer of energy to the part and to increase the surface area of the part subjected to the heat flow of the TIG arc via a magnetic oscillation or deviation of the arc. Indeed, according to the Laplace law, the arc located between the two poles of a magnetic circuit of a coil undergoes the action of a force F which has a tendency to displace it. If the current I in the coil is reversed, the induction then created changes direction and this reverses the displacement direction of the arc.

However, this solution is not completely satisfactory since it does not make it possible to obtain an improvement of the productivity in automatic TIG welding. Indeed, in order to retain a correct penetration at high speeds, that is to say around 2 m/min, it is necessary to use a high welding current, that is to say of 250 to 300 A, in order to maintain the energy provided per unit surface area. However, the more the welding current is increased, the more the axial component of the Lorentz force exerted on the arc by the field B which it creates increases and an arc which is said to be more rigid is then obtained. It hence becomes more difficult to displace the arc cone due to the stress created by the coil.

Furthermore, as shown by B. Keene et al., *Effects of interaction between surface active elements on the surface tension of iron,*"; Canadian Metallurgical Quarterly, 1982; vol. 21; no. 4; pp. 393-403; C. Heiple et al., *Mechanism for minor element effects on GTA fusion zone geometry*, Welding Journal, April 1982, pp. 97-102; and *The effect of trace elements on TIG weld penetration*; in Proceedings of TWI international conference: The effects of residual, impurity and micro-alloying elements on weldability and weld properties; London, England; Nov. 15-17, 1983, in many cases, the flows of molten metal, the heat transfer and the shape of the weld and also its properties are significantly influenced by Marangoni convection. The presence of a surfactant element, such as S or O, in the weld pool alters the surface tension of the solvent. Indeed, the surfactant elements change the dependence of the surface tension on the temperature ($d\gamma/dT$) from a negative value for the pure solvents to a positive value for binary systems. This change in the sign of ($d\gamma/dT$) has an impact on the systems.

Hence, it is possible to influence the shape of the bead by playing with the nature and the amount of surfactant elements introduced into the pool, via a fusible wire containing these elements, so as to give rise to a reversal of the direction of circulation of the molten metal in the weld pool, knowing that this appears in steels in the presence of small amounts of surfactants.

This solution had been envisaged in order to overcome the defects of the process with flux known as "A-TIG". The activating effect obtained by the flux is undeniable, its drawback is that it imposes a supplementary preparation operation, namely the deposition of the flux. Moreover, since the zone prepared has a surface area greater than that of the bead, the amount of product consumed is larger than what is actually needed. The use of a flux-cored wire could make it possible to overcome these defects by introducing the active constituents continuously at the very moment of welding by means of this wire. The elimination of the preparation operation, deposition of the flux with a brush, can be beneficial. However tests have shown that the provision of wire leads to considerable operating constraints, in particular the low wire speeds lead to problems of unwinding. As with the flux deposited at the surface, the use of activating wires requires low voltages therefore short arcs. The difficulty is then to correctly position the wire in the pool. The use of this process is not therefore easy and the reproducibility of the results, at identical parameters, is not demonstrated since the position of the wire relative to the electrode and to the pool has an influence on the parameters necessary for obtaining penetration.

In a single-flow TIG welding, an optimization of the physical welding parameters, such as the grinding angle of the electrode, the nature of the protective gas or the inclination of the torch may make it possible, in certain cases, to arrive at a slight shift in the speed of the appearance of "humping" but the gain is of very small amplitude.

Thus, a use of hydrogen or helium as protective gas in single-gas-flow TIG welding, instead of argon, does not make it possible to increase the maximum speed for appearance of "humping" in fusion line configuration. These gases only make it possible to extend the zone of heat influence and to obtain a more fluid pool owing to the high thermal conductivity of these gases.

However, the magnetic pressure exerted on the pool is also increased since a tightening of the distribution of the current lines is witnessed due to the higher ionization potential of these gases compared to argon. This then results in a more pronounced depression under the arc of the weld pool. This corresponds to a more pronounced backward displacement of the pool and results in the conditions for the appearance of "humping" being shifted to another equilibrium point between electromagnetic pressure of the arc and hydrostatic pressure of the pool.

Furthermore, W. Savage et al., *Effect of arc force on defect formation in GTA welding*, Welding Journal, 1979, vol. 58, no. 7, pp. 212-224, describes the use, in dual-flow TIG welding, of an argon/$O_2$ mixture as peripheral gas in order to allow a better penetration.

However, this solution is not ideal either since the pneumatic constriction action of the arc, resulting from the dual gas flow, makes it possible to increase the penetration and therefore to increase the volume of molten metal at equal bead width, this is accompanied by a not very large increase in the observed maximum speed.

Furthermore, when the peripheral or annular gas contains $O_2$, very different results are obtained in terms of improvement in the maximum speed. These differences in performance may be explained by variations in the compositions of the steel sheets welded. Indeed, the S and O elements present in the steels have a surfactant effect and the optimum in O is inevitably dependent on the content of S. If the content of S is such that ($d\gamma/dT$) is already positive, the provision of O has no effect but to increase the temperature $T_O$. The inversion point of the convection flow is therefore close to the center. However, the beneficial effect is not of the same extent as with a passage from negative to positive of ($d\gamma/dT$).

Moreover, S and O combine their effects but in fact it is a question of "soluble" S and O, that is to say which are not linked to another element in the form of a chemical compound since if this is the case they no longer have an influence on the surface tension. It is therefore advisable to distinguish the surfactant elements (sulfur, oxygen, selenium and tellurium), the reactive elements which will trap, in the form of compounds, one or other of the surfactant elements and will therefore reduce the content of this element in the soluble state (e.g. Al for oxygen, calcium, cerium or lanthanum for sulfur) and the neutral elements.

In the case of oxygen, particular attention should be paid to aluminum since aluminum is used as a deoxidant during the production of steel and the residual aluminum may vary greatly depending on the castings and the practices of the steel manufacturer.

This makes any industrialization of this method impossible since it is not possible in practice to control the oxygen content of the gas used as a function of the amount to be transferred into the pool in free form.

The problem that is faced is hence to be able to eliminate the defects linked to "humping" and make it possible to achieve higher travel speeds in the automatic TIG welding of steel, in particular speeds of at least 2 m/min.

The solution is an electric arc welding process using an arc welding torch equipped with an electrode, in which a central gas flow is delivered in contact with the electrode and an annular gas flow is delivered peripherally, that is to say annularly, to said first gas flow, characterized in that:
- the central gas flow consists solely of argon and hydrogen ($H_2$), the hydrogen content being between 2 and 8% by volume, and
- the sheath gas flow consists solely of argon and of 1.8 to 3% by volume of carbon dioxide ($CO_2$) or of 0.9 to 1.5% by volume of oxygen ($O_2$).

Depending on the case, the process of the invention may comprise one or more of the following features:
- the arc welding torch is equipped with an infusible electrode made of tungsten; it is therefore a TIG torch;
- the central gas flow contains at least 3% by volume of $H_2$;
- the central gas flow contains at most 7% by volume of $H_2$;
- one or more parts made of steel, in particular made of stainless steel or of carbon steel, in particular steels coated with a surface coating of zinc, aluminum or any other material intended to prevent the corrosion of the steel in question, are welded;
- the part or parts to be welded are chosen from tailored blanks;
- the welding is carried out at a rate of at least 2 m/min;
- the torch is installed on an automatic or automated welding installation; and the gas mixtures contain inevitable impurities.

The present invention will now be better understood by virtue of the following comparative examples given by way of illustration.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1, which is taken from the document by W. Savage, et al., Effect of arc force on defect formation in GTA welding, Welding Journal, 1979, vol. 58, no. 7, pp. 212-224, represents the welding speed (on the y-axis, expressed in cm/min) as a function of the welding current (on the x-axis, expressed in A).

FIG. 2 illustrates the thermal conductivities (on the y axis) of the components of the protective gas mixtures as a function of the temperature (on the x axis).

EXAMPLES

To try to solve the problem of "humping", within the context of the present invention, metal flows and weld bead formation have been studied in the presence of several different gases or gas mixtures in automatic dual-flow TIG welding.

In particular, the combined action of a central gas flow formed of an $Ar/H_2$ mixture and of an annular gas flow formed of an $Ar/CO_2$ mixture for increasing the welding speed were tested. This combination was carefully chosen to benefit from the features of each component in order to obtain the desired effects.

Thus, argon facilitates the initiation of the arc and stabilizes it owing to its low ionization energy of 15.8 eV compared with 24.6 eV needed for helium.

Hydrogen is added to increase the energy of the arc. Since $H_2$ is a diatomic molecule, its presence in the gas mixture will increase the supply of heat to the sheet owing to the energy released during the recombination (4.5 eV/molecule). Moreover, the higher thermal conductivity of the hydrogen also increases the temperature of the pool.

At high temperatures, that is to say temperatures of more than 5000 K, 97 mol % of $CO_2$ of the annular gas flow is dissociated in the arc according to the equation: $CO_2 \rightarrow CO + ½ O_2$, which leads to the formation of oxygen. Oxygen is a surfactant element, its presence in the molten metal lowers the surface tension of the metal. Thus, the document by B. Keene, *Review of data for the surface tension of iron and its binary alloys*, International Materials Reviews, 1988, vol. 33, no. 1, pp. 1-37, gives, for a binary Fe—O mixture, the equation: $\gamma_{Fe-O} = \gamma_{Fe} - 7490[at.-\% \ O]$. The oxygen formed will therefore fluidize the pool.

In an alternative manner to the $CO_2$, it is possible to use oxygen but at a content two times lower in the annular gas flow, as explained below.

FIG. 2 illustrates the thermal conductivities (on the y-axis) of the components of the protective gas mixtures as a function of the temperature (on the x-axis). The thermal conductivity is defined as being the speed at which heat propagates by conduction across a unit surface area, normal to the direction of the heat flow, and this per unit of length and unit of temperature difference. It therefore controls the transfer of heat by conduction and has an impact on the morphology of the bead, the temperature of the weld pool and the wetting.

It can be seen in FIG. 2 that helium and hydrogen have higher thermal conductivities than that of argon and will therefore make it possible to obtain more energetic arcs.

Table 1 below gives the compositions (% by volume) of the various gases G1 to G9 which were tested in dual-flow TIG welding.

TABLE 1

| % by volume | Ar | $H_2$ | He | $CO_2$ | $O_2$ |
|---|---|---|---|---|---|
| G1 | 100 | / | / | / | / |
| G2 | 98 | 2 | / | / | / |
| G3 | 95 | 5 | / | / | / |
| G4 | 99 | / | / | 1 | / |
| G5 | 98 | / | / | 2 | / |
| G6 | 95 | / | / | 8 | / |
| G7 | 99 | / | / | / | 1 |
| G8 | 98.5 | / | / | / | 1.5 |
| G9 | 80 | / | 20 | / | / |

Table 2 below records the results obtained in terms of maximum welding speed (Vs) before appearance of the "humping" phenomenon on A42 steel parts having a thickness of 1.5 mm, using a conventional automatic dual-flow TIG welding torch equipped with a pointed infusible electrode having a diameter of 3.2 mm made of ceriated tungsten of W-2% $CeO_2$ type, with an arc height of around 2 mm and a welding current of around 200 A and by using various combinations of the gases G1 to G9.

TABLE 2

| Test No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Central gas | G1 | G2 | G5 | G9 | G1 | G1 | G1 | G1 | G1 | G3 | G3 | G3 | G3 | G3 |
| Annular gas | G1 | G1 | G1 | G1 | G4 | G5 | G6 | G7 | G8 | G4 | G5 | G6 | G7 | G8 |
| Vs max (cm/min) | 200 | 200 | 230 | 220 | 220 | 250 | 220 | 250 | 240 | 250 | 300 | 220 | 300 | 240 |

It emerges from table 2 that the pairs G3/G5 (test 11) and G3/G7 (test 13) according to the invention offer the best performances both in terms of increase in speed and of limitation of the oxides present at the surface. In fact, with these particular combinations of gases, there is a surfactant effect coupled with an increase in the volume of molten metal and with a rise in the temperature of the pool, which goes toward confirming Marangoni convection since this is then directed toward the center of the bead. Consequently, an equilibrium of the pressures forms in the transition zone which is modified since the pressure of the weld pool is increased. The pool has a better aptitude for wetting, therefore the dry zones are covered more rapidly. Finally, the hotter pool solidifies more slowly.

These tests 11 and 13 therefore confirm the advantage of working with a $CO_2$ content of much less than around 3% or an $O_2$ content of much less than around 1.5% (the rest being argon), preferably a $CO_2$ content of less than 2.5% or an $O_2$ content of less than 1.2%, advantageously contents of the order of 2% of $CO_2$ or of 1% of $O_2$, combined with a central flow of argon and of hydrogen between 2 to 8%, preferably a $H_2$ content between 4 and 7%, advantageously around 5% of $H_2$.

Indeed, as tests 12 and 14 show, the use of annular gases that are too highly charged with oxidizer, lead to a degradation in the performances by the appearance of an oxide film on the welded parts. This film of oxides thwarts the surfactant effect via an increase in the viscosity, or even leads to an appearance of larger or smaller black marks on the weld beads.

To prevent these damaging phenomena, the use of a too highly oxidizing gas mixture, as annular gas, is avoided.

Hence, in accordance with the invention, the $CO_2$ content is limited to 3% and the $O_2$ content to 1.5%, or even to less than 2.5% of $CO_2$ and to less than 1.3% of $O_2$.

Likewise, it is important to carefully choose the composition of the gas mixture containing hydrogen and argon used as central gas.

Indeed, hydrogen is one of the factors that gives rise to cold cracking (ferritic grades) and may also be the cause of porosities. It is therefore necessary to establish the metallurgical compatibility (non-hardening steels and austenitic stainless steels) of the gas mixture used and therefore to strictly control the $H_2$ content present in said mixture.

In order to do this, additional comparative tests were carried out, under the same operating conditions as before, but with different pairs of gases (cf. table 3 below) so as, in particular, to determine the best $H_2$ content to use and to confirm whether or not the oxygen had an effect equivalent to the $CO_2$ in the annular gas by comparison with the results obtained for the G3/G4 pair from table 3.

TABLE 3

| Central gas | Ar + 2% $H_2$ | Ar + 5% $H_2$ | Ar + 5% $H_2$ |
|---|---|---|---|
| Annular gas | Ar + 1% $CO_2$ | Ar + 1% $O_2$ | Ar + 1.5% $O_2$ |
| Maximum Vs | Lower than that obtained with G3 | Approx. equal to that obtained with G4 | Lower than that obtained with G4 |

(% by volume)

The results obtained show that:
- a central flow containing only 2% by volume of $H_2$ in argon (instead of 5% of $H_2$ for G3) leads to a lower maximum speed being obtained relative to that obtained with the G3/G4 pair. By limiting the hydrogen content, the effect on the provision of heat to the sheet is limited and both pool volume and temperature gradient are lost. Hence, it will be preferred to use $H_2$ contents of at least 2% by volume, more preferably greater than 3%, or even greater than 3.5%, advantageously between 4 and 8%.
- when the central flow is G3 (Ar+5% $H_2$) and when the peripheral annular flow is replaced by a mixture of argon and oxygen, then a volume content of 1% of $O_2$ leads to results that are substantially equivalent in terms of speed to G4 Ar+1% $CO_2$), whereas an increase in the $O_2$ content up to 1.5% in the annular gas distributed at the periphery, leads to a reduction in the speed performances and the appearance of the bead is also degraded. Indeed, all the available sites are already occupied by the soluble oxygen atoms and the additional soluble atoms only serve to create oxides. Therefore there is no positive effect on the Marangoni convection and conversely, an appearance of damaging oxide plates is observed, which oxide plates go toward increasing surface tensions and are detrimental to the appearance of the bead. At the temperatures that exist at the periphery of the arc, the $CO_2$ dissociates completely and working with a gas containing 1% of $O_2$ is equivalent to working with a gas containing 2% of $CO_2$. Hence, the $O_2$ content in the annular gas flow must not exceed 1.5% by volume, preferably an $O_2$ content of less than or equal to 1.3%, or even less than or equal to 1.2% will be used. An oxygen content of the order of 1% is particularly suitable.

The process of the invention is particularly suitable for welding motor vehicle sheets, such as tailored blanks.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An electric arc welding process using an arc welding torch equipped with an electrode comprising the steps of
   a) delivering a central gas flow in contact with the electrode and
   b) delivering an annular gas flow peripherally to said central gas flow, and wherein:
      i) the central gas flow consists essentially of argon and hydrogen ($H_2$), the hydrogen content being between 2 and 8% by volume, and
      ii) the annular gas flow consists essentially of argon and 1.8 to 3% by volume of carbon dioxide ($CO_2$), or 0.9 to 1.5% by volume of oxygen ($O_2$).

2. The process of claim 1, wherein the central gas flow is between 3% and 8% by volume of hydrogen.

3. The process of claim 1, wherein the central gas flow is between 4% and 8% by volume of hydrogen.

4. The process of claim 1, wherein the central gas flow is between 2% and 7% by volume of hydrogen.

5. The process of claim 1, wherein the annular gas flow consists of argon and of 1.8 to 2.5% by volume of carbon dioxide ($CO_2$) or of argon and of 0.9 to 1.3% by volume of oxygen ($O_2$).

6. The process of claim 1, wherein the arc welding torch is equipped with an infusible electrode made of tungsten.

7. The process of claim 1, further comprising the step of welding one or more parts made of steel.

8. The process of claim 7, wherein the one or more parts made of steel comprise a zinc or aluminum surface coating.

9. The process of claim 1, further comprising the step of welding tailored blanks.

10. The process of claim 1, wherein the welding is carried out at a rate of at least 2 m/min.

* * * * *